United States Patent
Chen (10) Patent No.: US 9,553,961 B2
(45) Date of Patent: Jan. 24, 2017

(54) WIRELESS MULTIMEDIA COMMUNICATION DEVICE

(71) Applicant: Gemtek Technology Co., Ltd., Hsinchu (TW)

(72) Inventor: Hung-Wen Chen, Hsinchu County (TW)

(73) Assignee: Gemtek Technology Co., Ltd., Hsinchu (TW)

( * ) Notice: Subject to any disclaimer, the term of this patent is extended or adjusted under 35 U.S.C. 154(b) by 659 days.

(21) Appl. No.: 14/064,191

(22) Filed: Oct. 28, 2013

(65) Prior Publication Data

US 2014/0320628 A1    Oct. 30, 2014

(30) Foreign Application Priority Data

Apr. 30, 2013  (TW) .............................. 102115452 A (51) Int. Cl.
| | |
|---|---|
| G06F 1/16 | (2006.01) |
| H04M 1/02 | (2006.01) |
| H04N 7/14 | (2006.01) |
| H04M 1/22 | (2006.01) |

(52) U.S. Cl.
CPC ......... *H04M 1/0264* (2013.01); *H04M 1/0202* (2013.01); *H04N 7/142* (2013.01); *H04M 1/22* (2013.01); *H04M 2250/22* (2013.01)

(58) Field of Classification Search
CPC ........ H04M 1/0264; H04M 1/02; H04M 1/03; H04M 1/04; H04M 1/725
See application file for complete search history.

(56) References Cited

U.S. PATENT DOCUMENTS

| | | | | |
|---|---|---|---|---|
| 6,217,408 | B1* | 4/2001 | Willinger | A01K 15/025 119/707 |
| 7,028,428 | B1* | 4/2006 | Spencer | A01M 31/06 43/2 |
| 7,258,591 | B2* | 8/2007 | Xu | A63H 33/26 446/273 |
| 8,462,262 | B2* | 6/2013 | Yang | H04M 1/0235 348/333.1 |
| 2005/0112992 | A1* | 5/2005 | Malcolm | A63H 9/00 446/325 |
| 2006/0077655 | A1* | 4/2006 | Canella | F21L 4/00 362/158 |
| 2010/0100514 | A1* | 4/2010 | Raymond | G06K 9/00771 706/20 |
| 2010/0248828 | A1* | 9/2010 | Kaing | G09B 5/06 463/31 |

(Continued)

FOREIGN PATENT DOCUMENTS

| | | |
|---|---|---|
| CN | 1750550 A | 3/2006 |
| CN | 201018530 Y | 2/2008 |

(Continued)

*Primary Examiner* — Anthony Q Edwards
(74) *Attorney, Agent, or Firm* — Winston Hsu; Scott Margo (57) ABSTRACT

A wireless multimedia communication device includes a shell module, a wireless module, and an energy storage module. The shell module has a waterproof function. The wireless module installed in the shell module has a mobile communication function. The energy storage module installed in the shell module for storing energy. When the wireless module is turned on, the wireless module utilizes the energy to operate.

39 Claims, 11 Drawing Sheets

(56) References Cited

U.S. PATENT DOCUMENTS

| | | | | |
|---|---|---|---|---|
| 2011/0063449 A1* | 3/2011 | Lee | ............... | G08B 13/1963 |
| | | | | 348/159 |
| 2013/0233630 A1* | 9/2013 | Salter | ............... | A63B 43/00 |
| | | | | 180/21 |
| 2013/0257018 A1* | 10/2013 | Fung | ............... | B60R 99/00 |
| | | | | 280/638 |

FOREIGN PATENT DOCUMENTS

| | | |
|---|---|---|
| CN | 101588482 A | 11/2009 |
| CN | 102243540 A | 11/2011 |
| TW | M376430 U1 | 3/2010 |
| TW | I331863 | 10/2010 |
| TW | 201233225 | 8/2012 |
| TW | M447069 U1 | 2/2013 |

\* cited by examiner

WIRELESS MULTIMEDIA COMMUNICATION DEVICE

BACKGROUND OF THE INVENTION

1. Field of the Invention

The present invention relates to a wireless multimedia communication device, and particularly to a wireless multimedia communication device that has a wireless communication function, a wireless charging function, and a characteristic similar to "tumbler".

2. Description of the Prior Art

In the prior art, a monitor with a Wireless Fidelity (Wi-Fi) function, a fourth generation (4G) mobile communication function, or a third generation (3G) mobile communication function usually be installed fixedly near an indoor ceiling, on a building wall, or near a computer, so the monitor is not usually moved easily after the monitor is installed. Because the monitor is usually installed fixedly, an image capture range of the monitor can not be changed at will.

Therefore, how to make the monitor be a light portable electronic device and the image capture range of the monitor adjustable anytime is an important issue for a monitor designer.

SUMMARY OF THE INVENTION

An embodiment provides a wireless multimedia communication device. The wireless multimedia communication device includes a shell module, a wireless module, and an energy storage module. The shell module has a waterproof function. The wireless module is installed in the shell module and has a mobile communication function. The energy storage module is installed in the shell module for storing energy, wherein when the wireless module is turned on, the wireless module operates by utilizing the energy.

Another embodiment provides a wireless multimedia communication device. The wireless multimedia communication device includes a shell module, a wireless module, and a tumbler module. The shell module has a waterproof function. The wireless module is installed in the shell module and has a mobile communication function. The tumbler module is installed in the shell module, wherein when the wireless multimedia communication device is changed from an imbalance state to a balance state on a contact surface, a distance between a center of gravity of the wireless multimedia communication device and a contact point of the contact surface is the shortest.

The present invention provides a wireless multimedia communication device. The wireless multimedia communication device has advantages as follows: first, because a shell module of the wireless multimedia communication device has heat emission holes or metal material, the wireless multimedia communication device dissipates heat easily when the wireless multimedia communication device operates; second, a wireless module of the wireless multimedia communication device can support a combination of a third generation mobile communication function, a fourth generation mobile communication function, a Wireless Fidelity function, a Wireless Local Area Network function, an IEEE 802.15.4 function, a Bluetooth function, a Wireless Wide Area Network function, a Global System for Mobile Communications function, a General Packet Radio Service function, a Worldwide Interoperability for Microwave Access function, an Actor Network Theory+ function, a Satellite Communication function, a hot spot function, and other Transmission Protocol Communication function; third, when the wireless multimedia communication device is away from a charging base a predetermined distance, the charging base can execute wireless charging on an energy storage module of the wireless multimedia communication device; fourth, the wireless multimedia communication device can be turned on or turned off according to a touch signal, or can be turned on or turned off according to a control signal generated by an electronic device; fifth, because wireless charging can be executed on the wireless multimedia communication device, the wireless multimedia communication device does not need an external power supply; sixth, because the wireless multimedia communication device has a characteristic similar to "tumbler", when the shell module has metal material and the wireless multimedia communication device stands, the present invention can utilize the characteristic similar to "tumbler" to make an antenna installed in the shell module not be influenced by shielding effect of the shell module; seventh, because the wireless multimedia communication device is not installed fixedly, a user can change an image capture range of the wireless multimedia communication device according to a practical requirement; eighth, because when the user does not need an image capture service provided by the wireless multimedia communication device, the user can turn off the wireless multimedia communication device, so the present invention can reduce power consumption of the wireless multimedia communication device; ninth, because the wireless multimedia communication device can move, roll, or fly according to an operation control signal generated by the electronic device, or the wireless multimedia communication device can move or roll because of motion of a carrier (for example, the wireless multimedia communication device can fly due to motion of the airplane when the wireless multimedia communication device is placed in an airplane, or the wireless multimedia communication device can move when the wireless multimedia communication device is placed in a car), so the user can move, roll, or fly the wireless multimedia communication device anytime through the electronic device to make at least one lens of the wireless multimedia communication device capture images wanted by the user; tenth, images captured by the at least one lens of the wireless multimedia communication device are used for forming a panorama image with various angles (e.g. 360°); eleventh, a view angle of the at least one lens of the wireless multimedia communication device is controlled by a view angle control signal of the electronic device, so the user can adjust the view angle of the at least one lens anytime through the electronic device to make the at least one lens capture images wanted by the user; twelfth, because the shell module and the at least one lens of the wireless multimedia communication device have a waterproof function, the user can utilize the at least one lens of the wireless multimedia communication device to capture images wanted by the user in water anytime.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
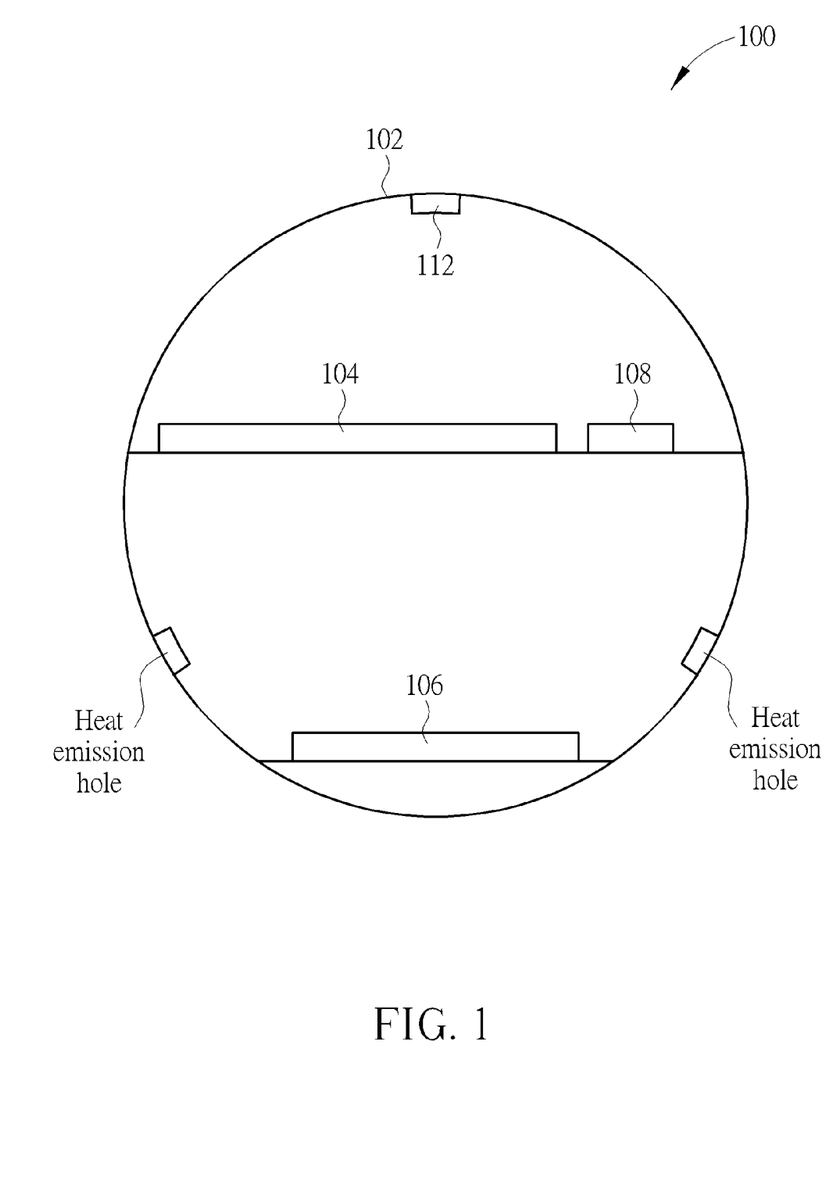
FIG. 1 is a diagram illustrating a cross section of a wireless multimedia communication device according to an embodiment.
Figure 2:
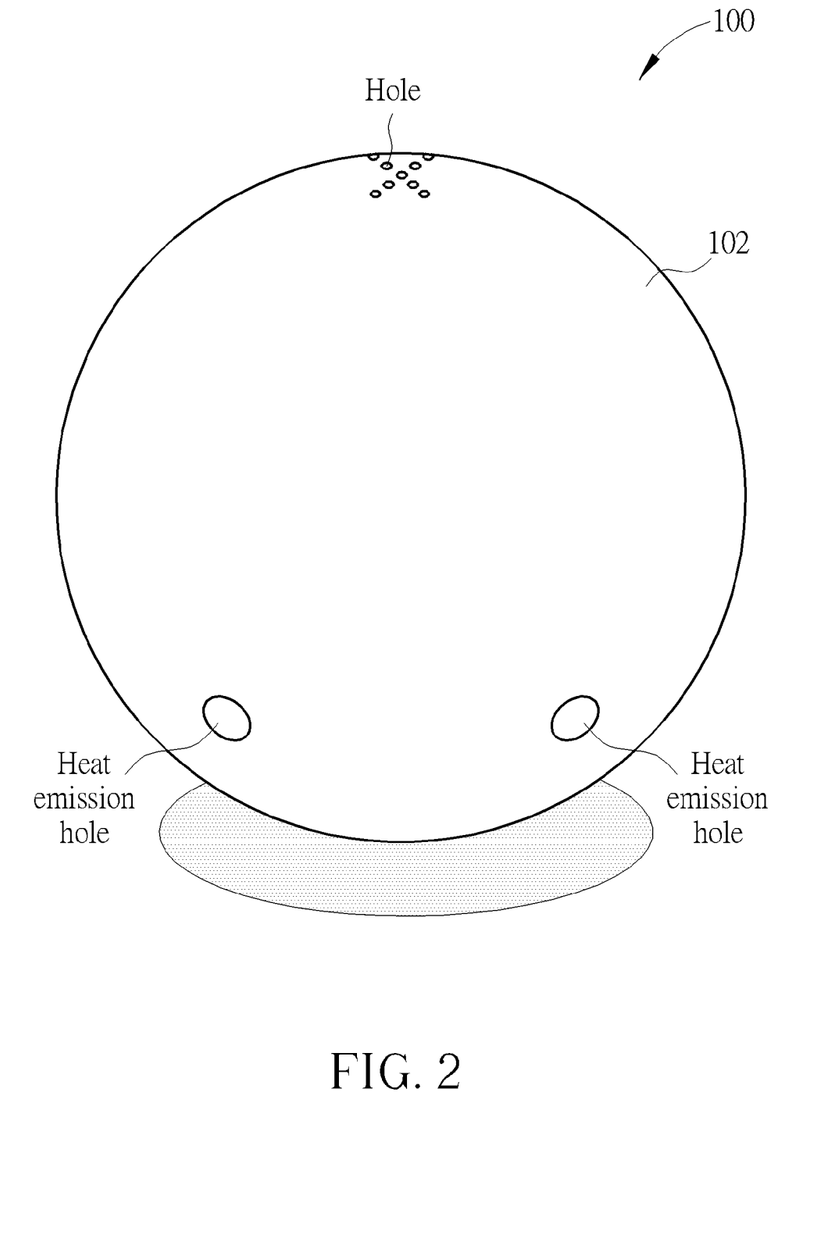
FIG. 2 is a diagram illustrating an appearance of the wireless multimedia communication device.

Please refer to FIG. 1 and FIG. 2. FIG. 1 is a diagram illustrating a cross section of a wireless multimedia communication device 100 according to an embodiment, and FIG. 2 is a diagram illustrating an appearance of the wireless multimedia communication device 100. The wireless multimedia communication device 100 includes a shell module 102, a wireless module 104, an energy storage module 106, wherein the shell module 102 is non-metal material, and the shell module 102 has at least one heat emission hole. But, the present invention is not limited to locations and number of heat emission holes in FIG. 1. But, in another embodiment of the present invention, the shell module 102 includes metal material. When the shell module 102 includes metal material, the shell module 102 can not have any heat emission hole. In addition, in another embodiment of the present invention, the shell module 102 needs to have a waterproof function, so the shell module 102 does not have any heat emission hole or any special designed heat emission hole (e.g. a heat emission hole covered by metal material). As shown in FIG. 1, the shell module 102 is a spherical shell, and has a touch function and a smooth surface, wherein the touch function of the shell module 102 is a capacitive touch function or a resistive touch function. In addition, the present invention is not limited to the shell module 102 having the smooth surface and the spherical shell. In addition, the present invention is also not limited to the shell module 102 having the touch function. As shown in FIG. 1, the wireless module 104 is installed in the shell module 102 and has a mobile communication function. For example, the wireless module 104 has a combination of a third generation (3G) mobile communication function, a fourth generation (4G) mobile communication function, a Wireless Fidelity (Wi-Fi) function, a Wireless Local Area Network (WLAN) function, an IEEE 802.15.4 (Zigbee) function, a Bluetooth function, a Wireless Wide Area Network (WWAN) function, a Global System for Mobile Communications (GSM) function, a General Packet Radio Service (GPRS) function, a Worldwide Interoperability for Microwave Access (WiMAX) function, an Actor Network Theory+ (Ant+) function, a Satellite Communication function, a hot spot function, and other transmission protocol communication function. In addition, a location of the wireless module 104 in FIG. 1 is only used for describing the wireless module 104 being installed in the shell module 102. That is to say, the present invention is not limited to the location of the wireless module 104 in FIG. 1. In addition, the wireless multimedia communication device 100 further includes an antenna 108. The antenna 108 is installed in the shell module 102, wherein the antenna 108 is coupled to the wireless module 104. The antenna 108 can be implemented by multiple methods provided by the prior art. For example, the antenna 108 can be implemented on a printed circuit board in the shell module 102 through a plurality antenna structures (e.g. a monopole antenna structure, a dipole antenna structure, or a Planar Inverted F Antenna (pifa) antenna structure) and materials (e.g. a printed circuit board, a chip, or iron). Therefore, the antenna 108 can receive or transmit a combination of a third generation mobile communication signal, a fourth generation mobile communication signal, a Wireless Fidelity signal, a Wireless Local Area Network signal, an IEEE 802.15.4 signal, a Bluetooth signal, a Wireless Wide Area Network signal, a Global System for Mobile Communications signal, a General Packet Radio Service signal, a Worldwide Interoperability for Microwave Access signal, an Actor Network Theory+ signal, a Satellite Communication signal, a hot spot signal, and other transmission protocol communication signal according to the mobile communication function of the wireless module 104. In addition, a location of the antenna 108 in FIG. 1 is only used for describing the antenna 108 being installed in the shell module 102. That is to say, the present invention is not limited to the location of the antenna 108 in FIG. 1. As shown in FIG. 1, the energy storage module 106 is installed in the shell module 102 for storing energy, wherein when the wireless module 104 is turned on, the wireless module 104 operates by utilizing energy stored in the energy storage module 106.

Figure 3:
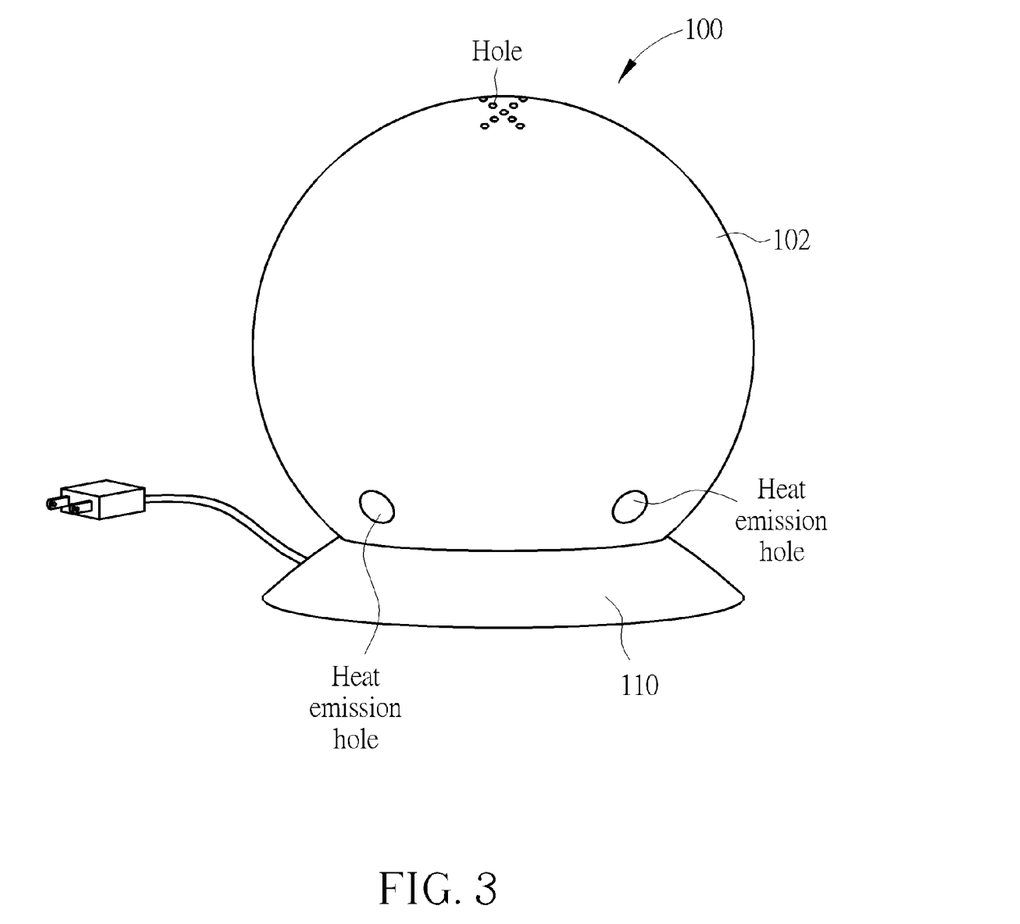
FIG. 3 is a diagram illustrating the wireless multimedia communication device being placed in a charging base.
Figure 4:
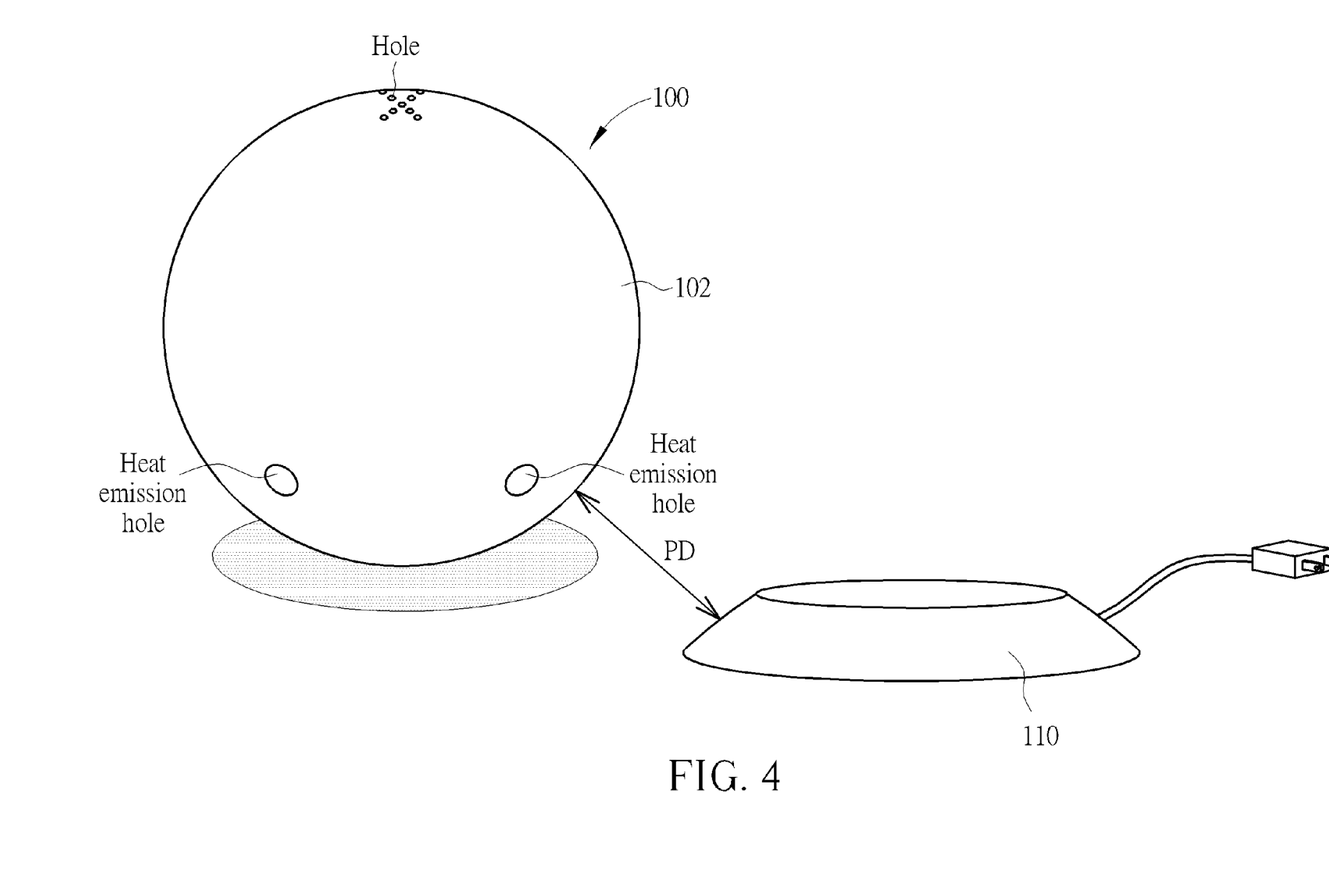
FIG. 4 is a diagram illustrating the wireless multimedia communication device being away from the charging base a predetermined distance.

Please refer to FIG. 3. FIG. 3 is a diagram illustrating the wireless multimedia communication device 100 being placed in a charging base 110, and FIG. 4 is a diagram illustrating the wireless multimedia communication device 100 being away from the charging base 110 a predetermined distance PD. As shown in FIG. 3, the charging base 110 can execute wireless charging on the energy storage module 106 of the wireless multimedia communication device 100 to make the energy storage module 106 of the wireless multimedia communication device 100 store energy when the wireless multimedia communication device 100 is placed in the charging base 110. As shown in FIG. 3, when the wireless multimedia communication device 100 is away from the charging base 110 the predetermined distance PD, the charging base 110 can still execute wireless charging on the energy storage module 106 of the wireless multimedia communication device 100 to make the energy storage module 106 of the wireless multimedia communication device 100 store energy.

Please refer to FIG. 1. When the shell module 102 has a touch function and an object (e.g. a finger of a user) touches the wireless multimedia communication device 100, the shell module 102 can generate a touch signal to the wireless module 104 and the wireless module 104 can be turned on or turned off according to the touch signal generated by the shell module 102. In another embodiment of the present invention, the wireless module 104 can be turned on or turned off according to a control signal generated by a physical button installed in the shell module 102. In another embodiment of the present invention, the wireless module 104 can be turned on or turned off according to a sound control signal of the user received by a sound transceiving unit 112 (as shown in FIG. 1) further included in the wireless multimedia communication device 100. In another embodiment of the present invention, the wireless module 104 can be turned on or turned off according to a gesture control signal of the user. When the wireless module 104 is turned on according to the touch signal, the wireless module 104 operates by utilizing energy stored in the energy storage module 106. In another embodiment of the present invention, when the wireless module 104 is turned on according to a touch signal, the user using the wireless multimedia communication device 100 can utilize a microphone and a speaker included in the sound transceiving unit 112 of the wireless multimedia communication device 100 and the mobile communication function of the wireless module 104 to execute a video conference function, or utilize the hot spot function of the wireless module 104 to execute a mobile internet function. For example, when the user wants to convene a video conference in a first meeting room, the user in the first meeting room not only can utilize the microphone and the speaker included in the sound transceiving unit 112 of the wireless multimedia communication device 100 and the mobile communication function of the wireless module 104 to execute the video conference with users in a second meeting room, but can also simultaneously utilize a mobile phone, a tablet computer, a desktop computer, or a notebook computer to connect to Internet to transcive e-mail, upload/download data, or receive images of the users of the second meeting room through the hot spot function of the wireless module 104.

It is noted that a location of the sound transceiving unit 112 in FIG. 1 is only an example, so the present invention is not limited to the location of the sound transceiving unit 112 in FIG. 1. In addition, for increasing performance of the sound transceiving unit 112, the shell module 102 has holes corresponding to the sound transceiving unit 112. But, in another embodiment of the present invention, the shell module 102 needs to have the waterproof function, so the shell module 102 does not have any hole corresponding to the sound transceiving unit 112 or any special designed hole corresponding to the sound transceiving unit 112 (e.g. a hole covered by metal material). In addition, when the wireless module 104 is turned on according to a touch signal, the sound transceiving unit 112 of the wireless multimedia communication device 100 can emit alarm sound. In another embodiment of the present invention, when the wireless module 104 is turned on according to a touch signal, a lighting unit further included in the wireless multimedia communication device 100 can emit alarm light. In another embodiment of the present invention, when the wireless module 104 is turned on according to a touch signal, a vibration unit further included in the wireless multimedia communication device 100 can generate alarm vibration. In another embodiment of the present invention, the wireless multimedia communication device 100 further includes a combination of a lighting unit, a sound transceiving unit, and a vibration unit. In addition, when energy stored in the energy storage module 106 is lower than a threshold value, the present invention can generate a combination of alarm sound, alarm light, and alarm vibration to notify the user through a combination of a lighting unit, a sound transceiving unit, and a vibration unit included in the wireless multimedia communication device 100. In addition, in another embodiment of the present invention, the wireless module 104 can be turned on or turned off according to a remote control signal generated by an electronic device (e.g. a mobile phone, a tablet computer, a desktop computer, or a notebook computer), and the wireless multimedia communication device 100 can also move, roll, or fly according to an operation control signal received by the wireless module 104 (e.g. an operation control signal generated by a mobile phone, a tablet computer, a desktop computer, or a notebook computer). Therefore, the wireless multimedia communication device 100 is not installed fixedly, so the user can move the wireless multimedia communication device 100 to change an image capture range of the wireless multimedia communication device 100 according to a practical requirement. For example, when the user wants to convene a video conference in the first meeting room, the user can make the wireless multimedia communication device 100 move to the first meeting room. Therefore, the user can utilize the wireless multimedia communication device 100 to capture an image of the first meeting room to execute the video conference.

Figure 5A:
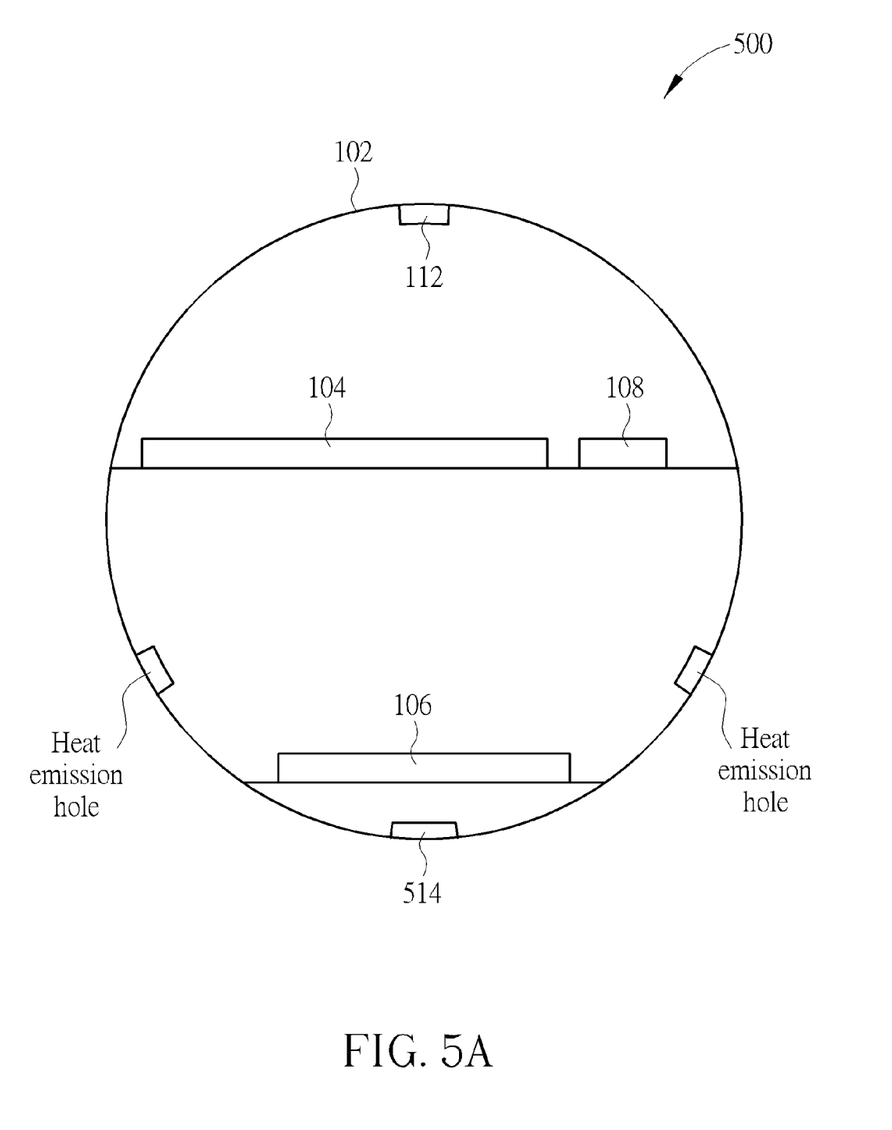
FIG. 5A is a diagram illustrating a cross section of a wireless multimedia communication device according to another embodiment.
Figure 5B:
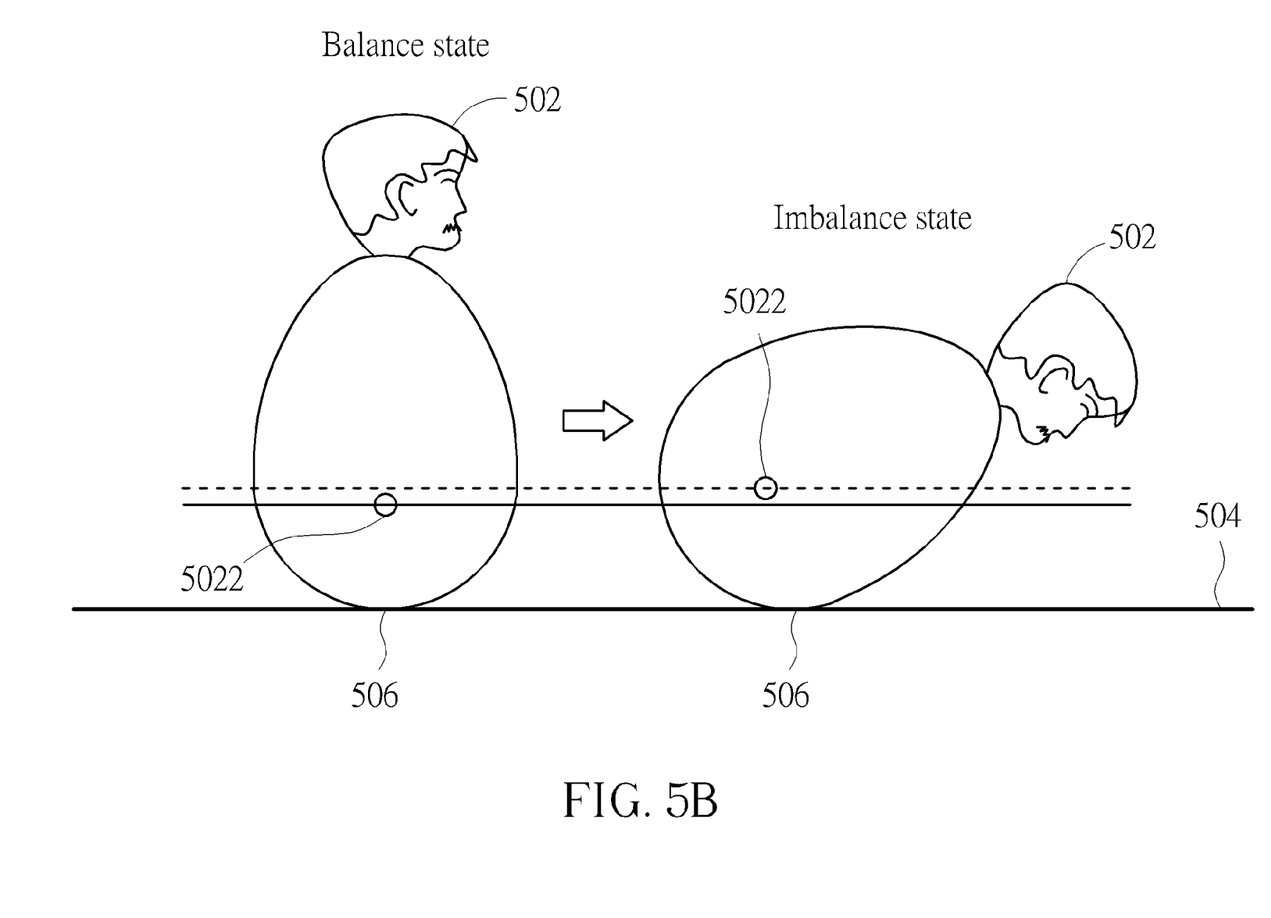
FIG. 5B is a diagram illustrating a principle of a "tumbler".

Please refer to FIG. 5A and FIG. 5B. FIG. 5A is a diagram illustrating a cross section of a wireless multimedia communication device 500 according to another embodiment, and FIG. 5B is a diagram illustrating a principle of a "tumbler". As shown in FIG. 5A, a difference between the wireless multimedia communication device 500 and the wireless multimedia communication device 100 is that the wireless multimedia communication device 500 further includes a tumbler module 514. But, the present invention is not limited to a location of the tumbler module 514 in FIG. 5A. When the wireless multimedia communication device 500 is changed from an imbalance state to a balance state on a contact surface, the tumbler module 514 can make a distance between a center-of-gravity of the wireless multimedia communication device 500 and a contact point of the contact surface the shortest. That is to say, the wireless multimedia communication device 500 has a characteristic similar to "tumbler". As shown in FIG. 5B, when a tumbler 502 is changed from the balance state to the imbalance state, a center-of-gravity 5022 of the tumbler 502 is increased (that is, a distance between the center-of-gravity 5022 of the tumbler 502 and a contact point 506 of a contact surface 504 is increased), so the tumbler 502 tends to change from the imbalance state to the balance state to make the distance between the center-of-gravity 5022 of the tumbler 502 and the contact point 506 the shortest. In addition, subsequent operational principles of the wireless multimedia communication device 500 are the same as those of the wireless multimedia communication device 100, so further description thereof is omitted for simplicity.

Figure 6:
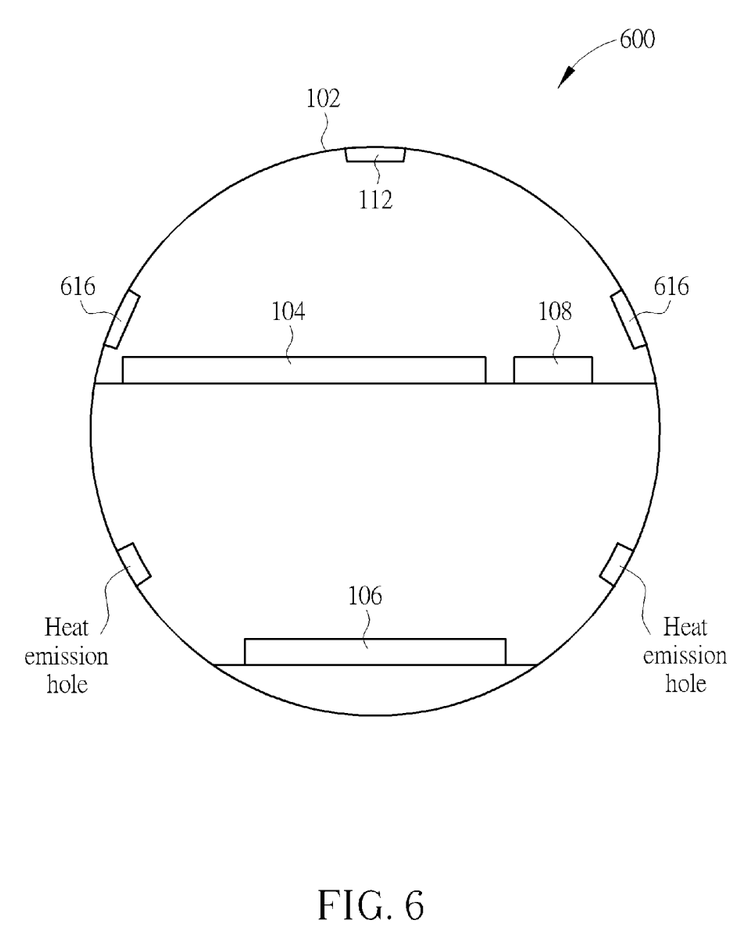
FIG. 6 is a diagram illustrating a cross section of a wireless multimedia communication device according to another embodiment.
Figure 7:
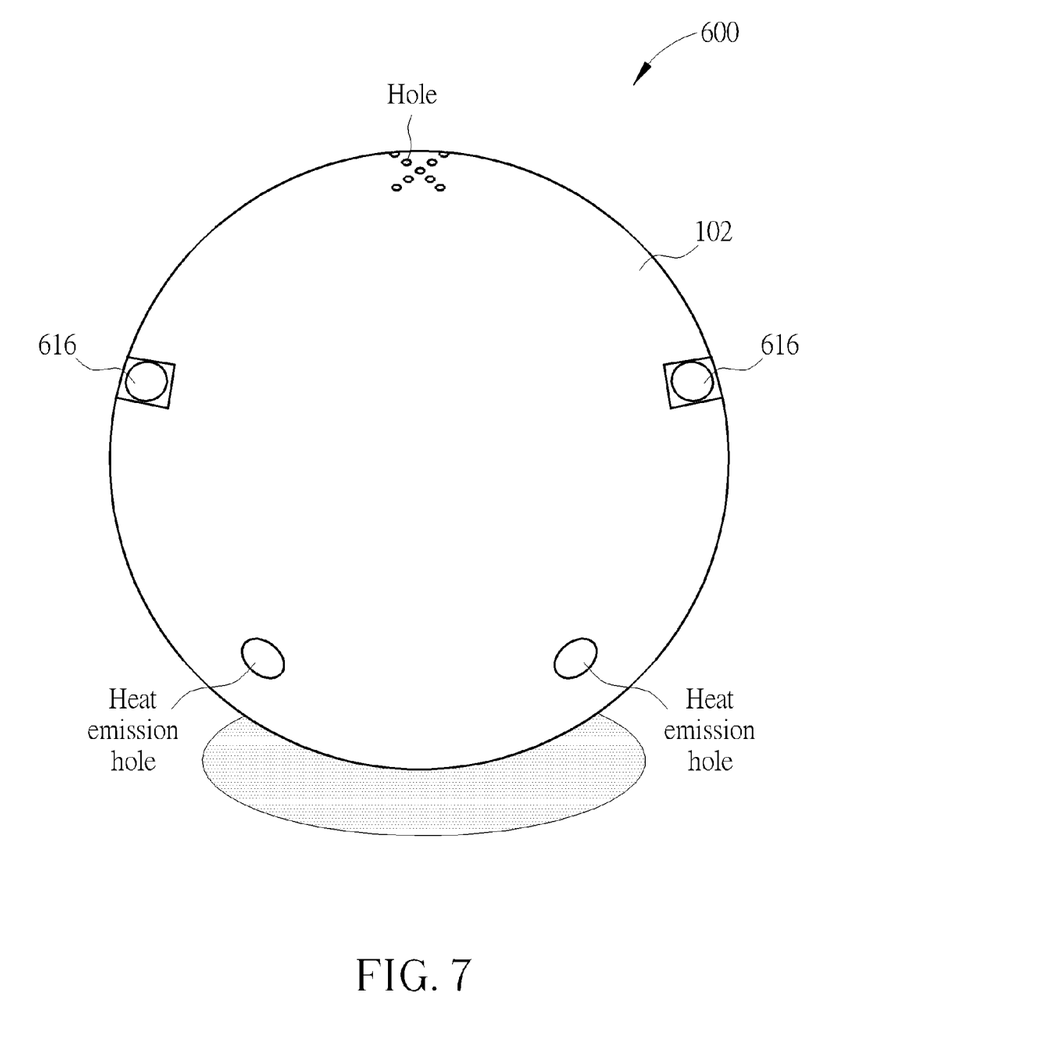
FIG. 7 is a diagram illustrating an appearance of the wireless multimedia communication device.

Please refer to FIG. 6 and FIG. 7. FIG. 6 is a diagram illustrating a cross section of a wireless multimedia communication device 600 according to another embodiment, and FIG. 7 is a diagram illustrating an appearance of the wireless multimedia communication device 600. A difference between the wireless multimedia communication device 600 and the wireless multimedia communication device 100 is that the wireless multimedia communication device 600 further includes 3 lenses 616 (FIG. 6 only shows 2 lenses 616 of the 3 lenses 616), wherein the 3 lenses 616 are installed on the shell module 102, and each lens 616 of the 3 lenses 616 can capture an image with a view angle over 120°. But, the present invention is not limited to the wireless multimedia communication device 600 including the 3 lenses 616. That is to say, the wireless multimedia communication device 600 can include more than one lens. In addition, the present invention is also not limited to each lens 616 of the 3 lenses 616 capturing an image with a view angle over 120°. As shown in FIG. 6 and FIG. 7, the shell module 102 of the wireless multimedia communication device 600 can also be turned on or turned off according to a remote control signal generated by an electronic device (e.g. a mobile phone, a tablet computer, a desktop computer, or a notebook computer), and the wireless multimedia communication device 600 can also move, roll, or fly according to an operation control signal received by the wireless module 104 (e.g. an operation control signal generated by a mobile phone, a tablet computer, a desktop computer, or a notebook computer). Therefore, a user can control motion, roll, or fly of the wireless multimedia communication device 600 through the electronic device any time to make the 3 lenses 616 of the wireless multimedia communication device 600 capture images wanted by the user.

As shown in FIG. 6 and FIG. 7, images captured by the 3 lenses 616 are used for forming a panorama image with various angles (e.g.) 360° surrounding the wireless multimedia communication device 600, and view angles of the 3 lenses 616 are controlled by view angle control signals (e.g. view angle control signals generated by a mobile phone, a tablet computer, a desktop computer, or notebook computer) received by the wireless module 104. However, in another embodiment of the present invention, the wireless multimedia communication device 600 further includes 2 lenses, wherein each lens of the 2 lenses can capture an image with a view angle over 180°. But, the present invention is not limited to each lens of the 2 lenses capturing an image with a view angle over 180°. For example, when the wireless multimedia communication device 600 is located at an indoor corner, each lens of the 2 lenses can capture an image with a view angle less than 180° because an image capture range of the wireless multimedia communication device 600 is less than 360°. In addition, in another embodiment of the present invention, the wireless multimedia communication device 600 further includes 4 lenses, wherein each lens of the 4 lenses can capture an image with a view angle over 90°. But, the present invention is not limited to each lens of the 4 lenses capturing an image with a view angle over 90°. For example, when the wireless multimedia communication device 600 is located at an indoor corner, each lens of the 4 lenses can capture an image with a view angle less than 90° because the image capture range of the wireless multimedia communication device 600 is less than 360°. Therefore, the present invention is not limited to number of lenses included in the wireless multimedia communication device 600 (only the number of lenses is greater than 1). That is to say, any configuration in which images captured by at least one lens of a shell module of a wireless multimedia communication device are used for forming a 360° panorama image surrounding the wireless multimedia communication device falls within the scope of the present invention. In addition, the view angles of the 3 lenses 616 can be rotated according to a view angle control signal. Therefore, the user can adjust the view angles of the 3 lenses 616 anytime through a mobile phone, a tablet computer, a desktop computer, or notebook computer to make the 3 lenses 616 capture images wanted by the user. In addition, in another embodiment of the present invention, the shell module 102 and the 3 lenses 616 of the wireless multimedia communication device 600 have a waterproof function. Therefore, the user can move, roll, or fly the wireless multimedia communication device 600 to water anytime through a mobile phone, a tablet computer, a desktop computer, or notebook computer to make the 3 lenses 616 of the wireless multimedia communication device 600 capture images wanted by the user in water. In addition, in another embodiment of the present invention, the 3 lenses 616 of the wireless multimedia communication device 600 have a motion detection function. Therefore, the 3 lenses 616 of the wireless multimedia communication device 600 start to capture images when a motion distance of an object within the view angles of the 3 lenses 616 of the wireless multimedia communication device 600 is greater than a predetermined value.

Figure 8:
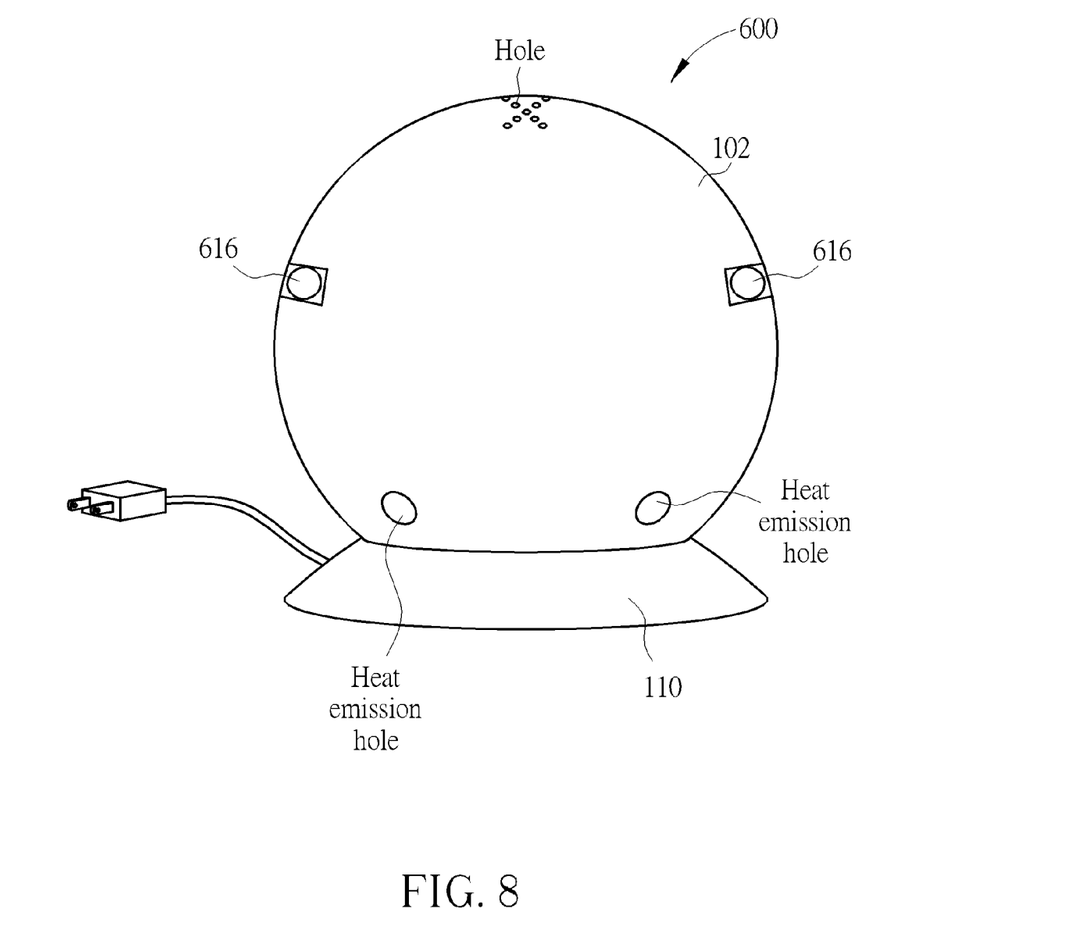
FIG. 8 is a diagram illustrating the wireless multimedia communication device being placed in the charging base.
Figure 9:
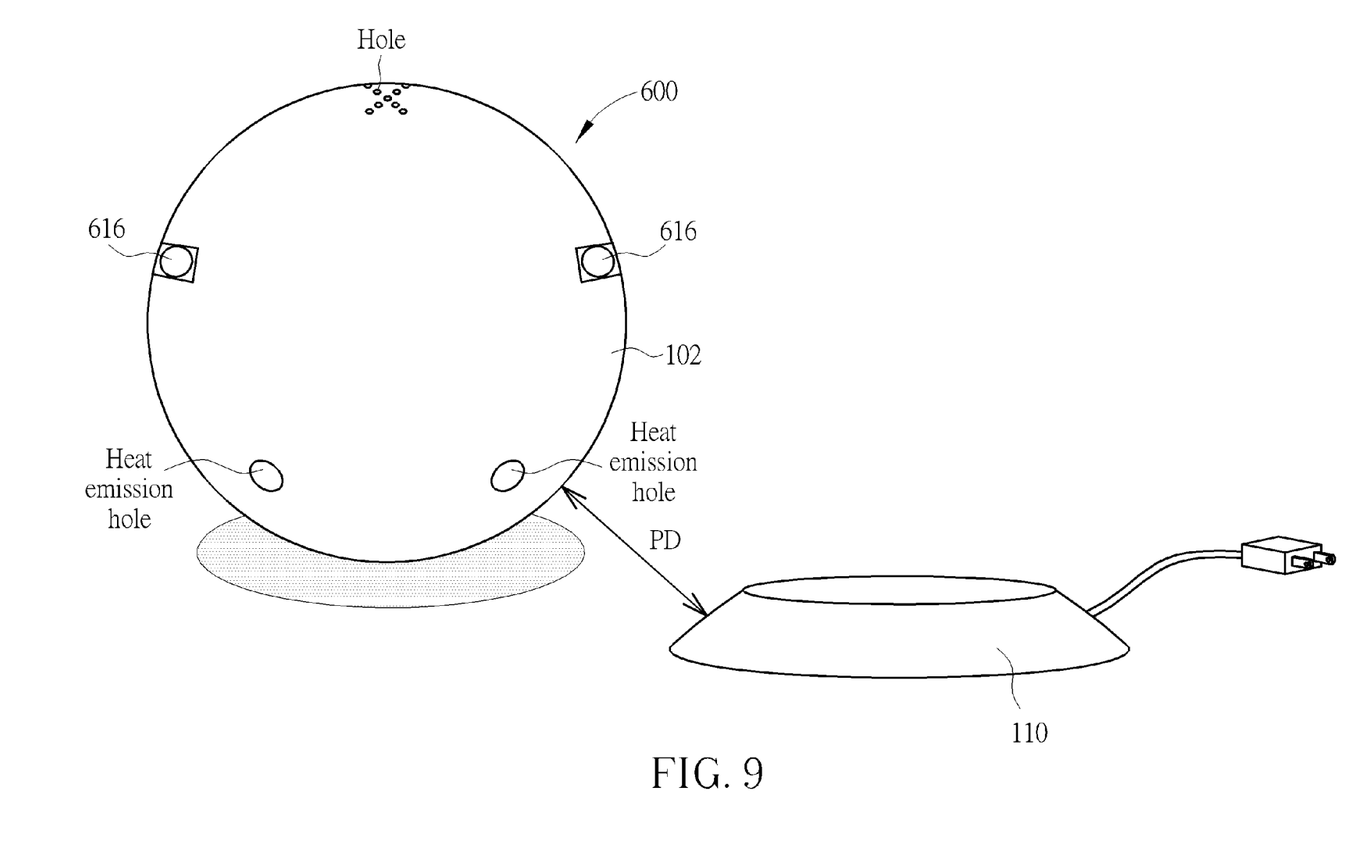
FIG. 9 is a diagram illustrating the wireless multimedia communication device being away from the charging base a predetermined distance.

Please refer to FIG. 6, FIG. 8, and FIG. 9. FIG. 8 is a diagram illustrating the wireless multimedia communication device 600 being placed in the charging base 110, and FIG. 9 is a diagram illustrating the wireless multimedia communication device 600 being away from the charging base 110 a predetermined distance PD. As shown in FIG. 8, when the wireless multimedia communication device 600 is placed in the charging base 110, the charging base 110 can execute wireless charging on the energy storage module 106 (as shown in FIG. 6) of the wireless multimedia communication device 600 to make the energy storage module 106 of the wireless multimedia communication device 600 store energy. As shown in FIG. 9, when the wireless multimedia communication device 600 is away from the charging base 110 the predetermined distance PD, the charging base 110 can still execute wireless charging on the energy storage module 106 of the wireless multimedia communication device 600 to make the energy storage module 106 of the wireless multimedia communication device 600 store energy. In addition, subsequent operational principles of the wireless multimedia communication device 600 are the same as those of the wireless multimedia communication device 100, so further description thereof is omitted for simplicity.

Figure 10:
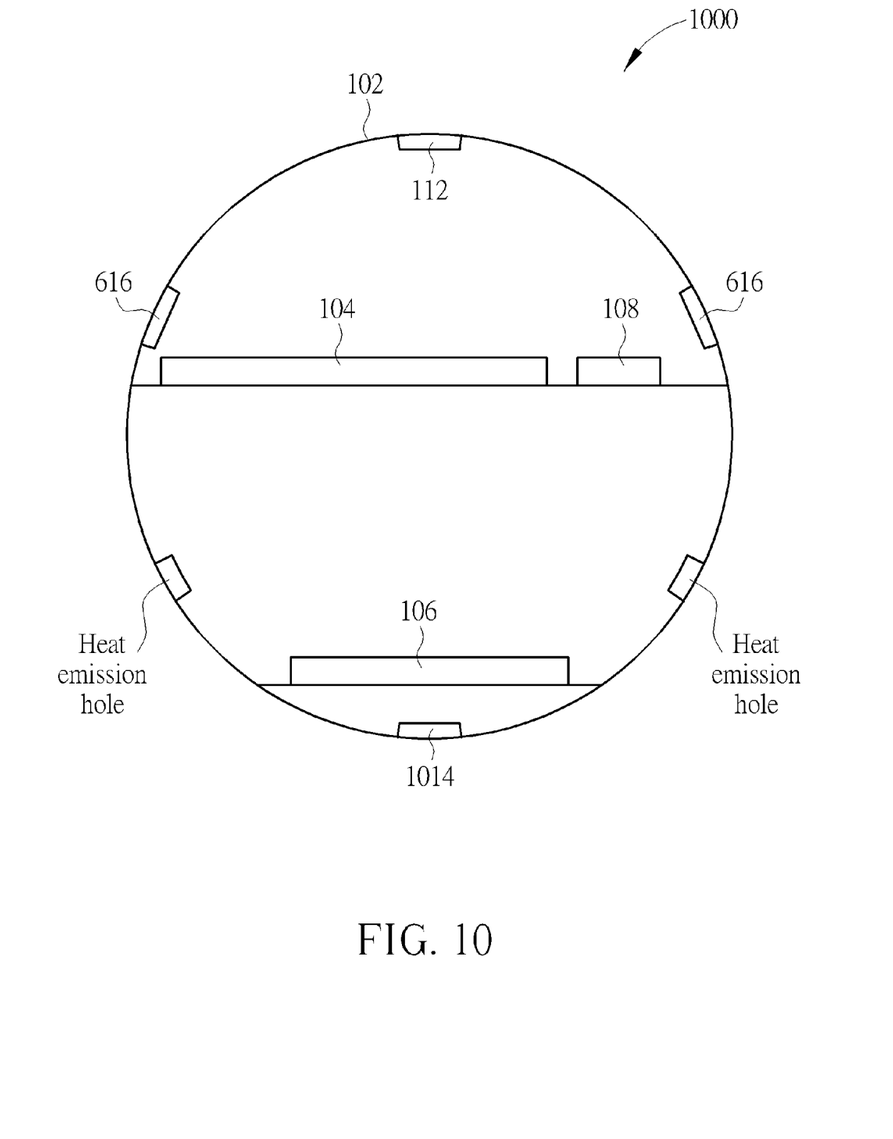
FIG. 10 is a diagram illustrating a cross section of a wireless multimedia communication device according to another embodiment.

In addition, please refer to FIG. 10. FIG. 10 is a diagram illustrating a cross section of a wireless multimedia communication device 1000 according to another embodiment. As shown in FIG. 10, a difference between the wireless multimedia communication device 1000 and the wireless multimedia communication device 600 is that the wireless multimedia communication device 1000 further includes a tumbler module 1014. When the wireless multimedia communication device 1000 is changed from an imbalance state to a balance state on a contact surface, the tumbler module 1014 can make a distance between a center-of-gravity of the wireless multimedia communication device 1000 and a contact point of the contact surface the shortest. In addition, subsequent operational principles of the wireless multimedia communication device 1000 are the same as those of the wireless multimedia communication device 600, so further description thereof is omitted for simplicity.

To sum up, the wireless multimedia communication device provided by the present invention has advantages as follows: first, because the shell module of the wireless multimedia communication device has heat emission holes or metal material, the wireless multimedia communication device dissipates heat easily when the wireless multimedia communication device operates; second, the wireless module of the wireless multimedia communication device can support a combination of a third generation mobile communication function, a fourth generation mobile communication function, a Wireless Fidelity function, a Wireless Local Area Network function, an IEEE 802.15.4 function, a Bluetooth function, a Wireless Wide Area Network function, a Global System for Mobile Communications function, a General Packet Radio Service function, a Worldwide Interoperability for Microwave Access function, an Actor Network Theory+ function, a Satellite Communication function, a hot spot function, and other transmission protocol communication function; third, when the wireless multimedia communication device is away from the charging base a predetermined distance, the charging base can execute wireless charging on the energy storage module of the wireless multimedia communication device; fourth, because wireless charging can be executed on the wireless multimedia communication device, the wireless multimedia communication device does not need an external power supply; fifth, the wireless multimedia communication device can be turned on or turned off according to a touch/physical button signal, or can be turned on or turned off according to a control signal generated by an electronic device; sixth, because the present invention has a characteristic similar to "tumbler", when the shell module has metal material and the wireless multimedia communication device stands, the present invention can utilize the characteristic similar to "tumbler" to make the antenna installed in the shell module not be influenced by shielding effect of the shell module; seventh, because the wireless multimedia communication device is not installed fixedly, a user can change an image capture range of the wireless multimedia communication device according to a practical requirement; eighth, because when the user does not need an image capture service provided by the wireless multimedia communication device, the user can turn off the wireless multimedia communication device, the present invention can reduce power consumption of the wireless multimedia communication device; ninth, because the wireless multimedia communication device can move, roll, or fly according to an operation control signal generated by an electronic device, or the wireless multimedia communication device can move or roll because of motion of a carrier (for example, the wireless multimedia communication device can fly due to motion of the airplane when the wireless multimedia communication device is placed in an airplane, or the wireless multimedia communication device can move when the wireless multimedia communication device is placed in a car), the user can move, roll, or fly the wireless multimedia communication device anytime through the electronic device to make at least one lens of the wireless multimedia communication device capture images wanted by the user; tenth, images captured by the at least one lens of the wireless multimedia communication device are used for forming a panorama image with various angles (e.g. 360°); eleventh, a view angle of the at least one lens of the wireless multimedia communication device is controlled by a view angle control signal of the electronic device, so the user can adjust the view angle of the at least one lens anytime through the electronic device to make the at least one lens capture images wanted by the user; twelfth, because the shell module and the at least one lens of the wireless multimedia communication device have a waterproof function, the user can utilize the at least one lens of the wireless multimedia communication device to capture images wanted by the user in water anytime.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wireless multimedia communication device, comprising:
    a shell module;
    a wireless module installed in the shell module, wherein the wireless module has a mobile communication function;
    an energy storage module installed in the shell module for storing energy, wherein when the wireless module is turned on, the wireless module operates by utilizing the energy; and
    N lenses disposed on the shell module;
    wherein each lens of the N lenses captures an image with a view angle over $(360/N)°$, the N images are used for forming a 360° panorama image, and N is a positive integer greater than two.

2. The wireless multimedia communication device of claim 1, wherein the shell module has a waterproof function.

3. The wireless multimedia communication device of claim 1, wherein the shell module is non-metal material, and the shell module has at least one heat emission hole.

4. The wireless multimedia communication device of claim 1, wherein the shell module comprises metal material.

5. The wireless multimedia communication device of claim 1, wherein the mobile communication function is a fourth generation (4G) mobile communication function or a Wireless Fidelity (Wi-Fi) function.

6. The wireless multimedia communication device of claim 1, wherein the shell module is a spherical shell.

7. The wireless multimedia communication device of claim 1, wherein the shell module has a touch function, and the wireless module is turned on or turned off according to a touch signal generated by the shell module.

8. The wireless multimedia communication device of claim 7, wherein the touch function is a capacitive touch function or a resistive touch function.

9. The wireless multimedia communication device of claim 7, further comprising:
    a lighting unit installed in the shell module, wherein when the wireless module is turned on according to the touch signal turned on, the lighting unit emits alarm light.

10. The wireless multimedia communication device of claim 7, further comprising:
    a sound transceiving unit installed in the shell module, wherein the sound transceiving unit comprises a microphone and a speaker, and when the wireless module is turned on according to the touch signal turned on, the sound transceiving unit emits alarm sound.

11. The wireless multimedia communication device of claim 7, further comprising:
    a vibration unit installed in the shell module, wherein when the wireless module is turned on according to the touch signal turned on, the vibration unit generates alarm vibration.

12. The wireless multimedia communication device of claim 1, wherein when the energy storage module is away from a charging base a predetermined distance, the charging base charges the energy storage module to make the energy storage module store the energy.

13. The wireless multimedia communication device of claim 1, wherein the wireless module is turned on or turned off according to a remote control signal.

14. The wireless multimedia communication device of claim 1, wherein motion, roll, or flight of the wireless multimedia communication device is controlled by an operation control signal received by the wireless module.

15. The wireless multimedia communication device of claim 1, wherein the N lenses have a waterproof function.

16. The wireless multimedia communication device of claim 1, wherein the view angle of each lens is controlled by a view angle control signal received by the wireless module.

17. The wireless multimedia communication device of claim 1, wherein the N lenses have a motion detection function.

18. The wireless multimedia communication device of claim 1, wherein the wireless module, the N lenses, and the sound transceiving unit are further used for executing a video conference.

19. The wireless multimedia communication device of claim 1, wherein the energy storage module stores the energy by a wireless or wired method.

20. A wireless multimedia communication device, comprising:
a shell module;
a wireless module installed in the shell module, wherein the wireless module has mobile communication function;
a tumbler module installed in the shell module, wherein when the wireless multimedia communication device is changed from an imbalance state to a balance state on a contact surface, a distance between a center-of-gravity of the wireless multimedia communication device and a contact point of the contact surface is the shortest; and
N lenses disposed on the shell module;
wherein each lens of the N lenses captures an image with a view angle over $(360/N)°$, the N images are used for forming a 360° panorama image, and N is a positive integer greater than two.

21. The wireless multimedia communication device of claim 20, further comprising:
an energy storage module installed in the shell module for storing energy, wherein when the wireless module is turned on, the wireless module operates by utilizing the energy.

22. The wireless multimedia communication device of claim 21, wherein the energy storage module stores the energy by a wireless or wired method.

23. The wireless multimedia communication device of claim 20, wherein the shell module has a waterproof function.

24. The wireless multimedia communication device of claim 20, wherein the shell module is non-metal material, and the shell module has at least one heat emission hole.

25. The wireless multimedia communication device of claim 20, wherein the shell module comprises metal material.

26. The wireless multimedia communication device of claim 20, wherein the mobile communication function is a fourth generation (4G) mobile communication function or a Wireless Fidelity (Wi-Fi) function.

27. The wireless multimedia communication device of claim 20, wherein the shell module is a spherical shell.

28. The wireless multimedia communication device of claim 20, wherein the shell module has a touch function, and the wireless module is turned on or turned off according to a touch signal generated by the shell module.

29. The wireless multimedia communication device of claim 28, wherein the touch function is a capacitive touch function or a resistive touch function.

30. The wireless multimedia communication device of claim 28, further comprising:
a lighting unit installed in the shell module, wherein when the wireless module is turned on according to the touch signal turned on, the lighting unit emits alarm light.

31. The wireless multimedia communication device of claim 28, further comprising:
a sound transceiving unit installed in the shell module, wherein the sound transceiving unit comprises a microphone and a speaker, and when the wireless module is turned on according to the touch signal turned on, the sound transceiving unit emits alarm sound.

32. The wireless multimedia communication device of claim 28, further comprising:
a vibration unit installed in the shell module, wherein when the wireless module is turned on according to the touch signal turned on, the vibration unit generates alarm vibration.

33. The wireless multimedia communication device of claim 20, wherein when the energy storage module is away from a charging base a predetermined distance, the charging base charges the energy storage module to make the energy storage module store the energy.

34. The wireless multimedia communication device of claim 20, wherein the wireless module is turned on or turned off according to a remote control signal.

35. The wireless multimedia communication device of claim 20, wherein motion, roll, or flight of the wireless multimedia communication device is controlled by an operation control signal received by the wireless module.

36. The wireless multimedia communication device of claim 20, wherein the N lenses have a waterproof function.

37. The wireless multimedia communication device of claim 20, wherein the view angle of each lens is controlled by a view angle control signal received by the wireless module.

38. The wireless multimedia communication device of claim 20, wherein the N lenses have a motion detection function.

39. The wireless multimedia communication device of claim 20, wherein the wireless module, the N lenses, and the sound transceiving unit are further used for executing a video conference.

* * * * *